UNITED STATES PATENT OFFICE.

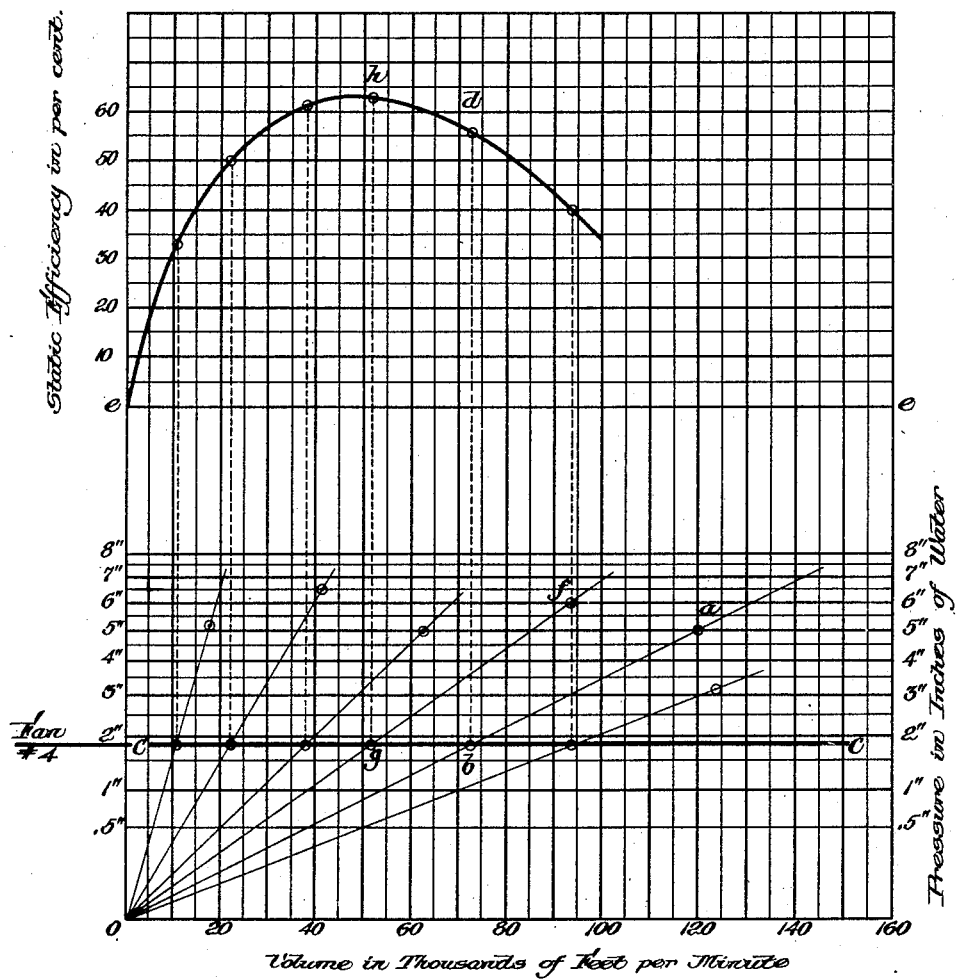

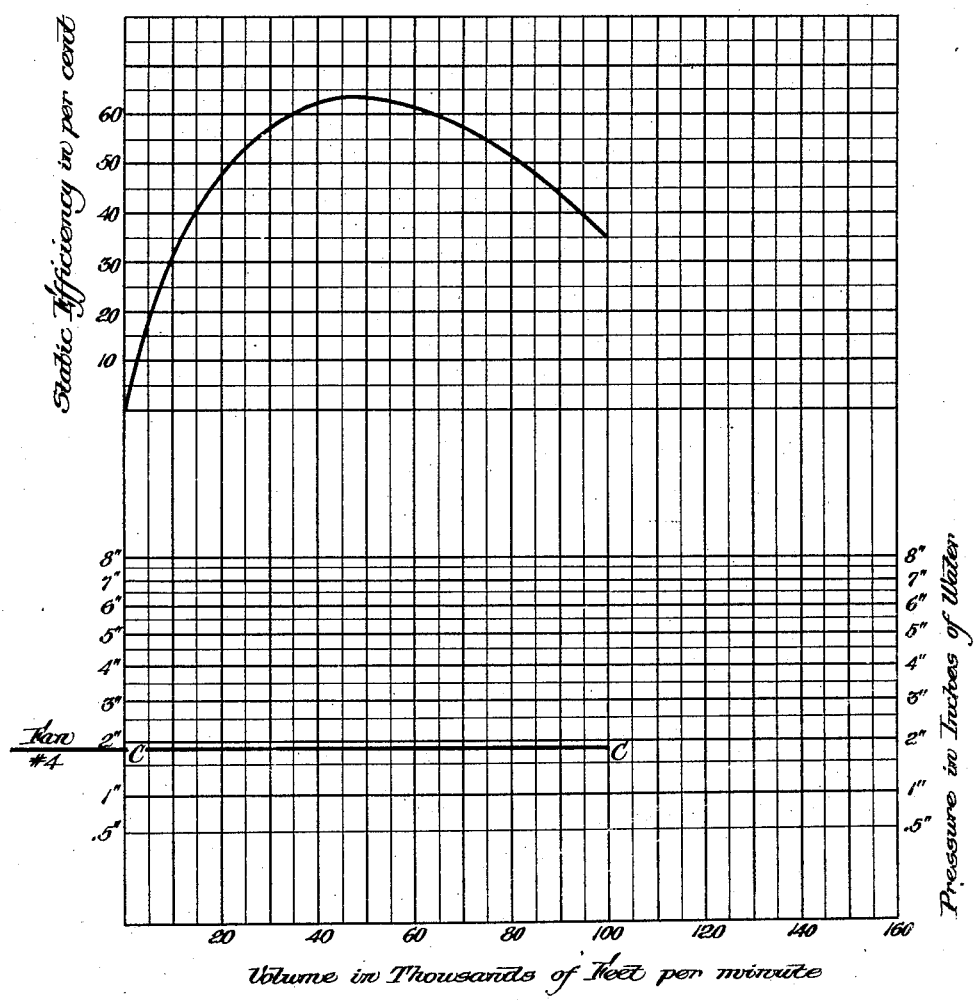

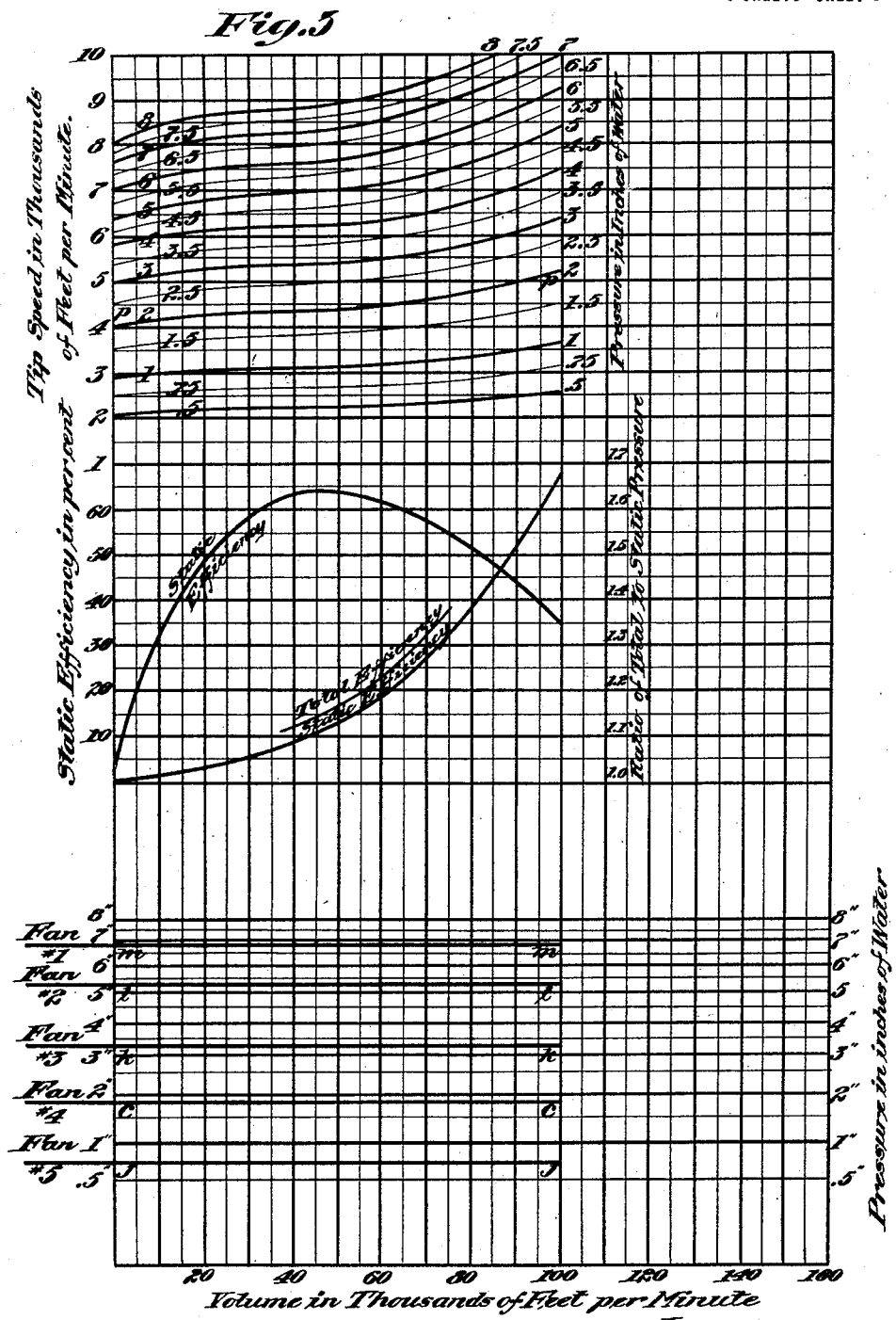

HAROLD F. HAGEN, OF BOSTON, MASSACHUSETTS, ASSIGNOR TO B. F. STURTEVANT COMPANY, OF BOSTON, MASSACHUSETTS, A CORPORATION OF MASSACHUSETTS.

FAN-CHART.

1,378,107.    Specification of Letters Patent.    Patented May 17, 1921.

Application filed June 16, 1916. Serial No. 104,064.

*To all whom it may concern:*

Be it known that I, HAROLD F. HAGEN, a citizen of the United States, residing at Boston, in the county of Suffolk and State of Massachusetts, have invented certain new and useful Improvements in Fan-Charts; and I do hereby declare the following to be a full, clear, and exact description of the invention, such as will enable others skilled in the art to which it appertains to make and use the same.

The present invention relates to charts or diagrams, and more particularly to charts for determining data as to the performance of fans, blowers, and the like.

The object of the present invention is to devise a chart by means of which some or all of such correlated data, as volume, pressure, efficiency, tip speed, etc., may be easily and quickly determined.

With these objects in view the present invention consists of the chart or diagram hereinafter described and more particularly defined in the claims.

In the accompanying drawings—

Figure 1 is a chart for indicating corresponding volumes, pressures, and efficiencies of a single fan, showing the manner of construction or laying out.

Fig. 2 is the same chart ready for use with the construction lines erased.

Fig. 3 is the same as Fig. 2 adapted for use with a number of fans of different size but all having the same proportion of parts, and also with additional curves to indicate tip speeds and ratios of total pressures to static pressures.

With the same duct or discharge opening, the volumes delivered by a fan are directly proportional to the tip speed, and the pressures developed are proportional to the square of the tip speed. Or, stated in other words, where the area of the passage opening remains constant the volume varies with the square root of the pressure.

If this relation of volume to pressure be plotted on cross section paper with uniformly spaced volume rulings in one direction, and pressure rulings spaced proportionately to square roots in the other direction, the result will be a straight line to the point of origin of the rulings. This line indicates all the different corresponding volumes and pressures which this fan will give with the same duct or discharge opening when operated at different tip speeds.

Inasmuch as variations in the tip speed do not affect the efficiency of operation of the fan, all the different volumes and corresponding pressures indicated by this line will be obtained at the same efficiency. Where, therefore, a number of different efficiencies have been determined by test or experiment each with a different ratio of discharge opening to area of fan outlet, thus giving different ratios of volume to square root of pressure, a chart or diagram may be devised from which the efficiency of the fan for any possible volume and pressure within the range of the fan may be easily and quickly determined. One method by which such a chart may be obtained is shown in Fig. 1 of the accompanying drawings, in which the uniformly spaced abscissæ indicate volumes, while pressures are indicated by the ordinates spaced according to the square roots of the pressures indicated. Assume that the fan under consideration by test with one ratio of discharge opening has been found to deliver 120,000 cubic feet of air per minute at a pressure of five inches of water, and with an efficiency of 55%. The point corresponding to this volume and pressure is indicated at *a*. An oblique line drawn through *a* and *o*, which is the point of origin of the rulings, will indicate at its different points along its length the different volumes which the fan will deliver, and the corresponding pressures at which such volumes will be delivered, all at the same efficiency of operation, namely, 55%. Such a line may for convenience be termed a volume-pressure line.

While any convenient means may be employed whereby the efficiency of 55% may be indicated for all points on this line, the preferred arrangement is as follows: Any point such as *b* on this volume-pressure line having been chosen as the point corresponding to the 55% efficiency, through this point *b*, a line is drawn indicated by *c—c* parallel with the line of pressure origin. This line *c—c* may, for want of a better term, be called the fan line. Projecting *b*, the point of intersection of the fan line *c—c* and the oblique line *a—o* in a direction parallel with the volume rulings, a point *d* may be laid off at a distance from some arbitrarily chosen base line e—e at a distance equal to 55% on an arbitrarily chosen scale. This locates the point d on the efficiency curve of the fan corresponding to 55% at which any of the volumes and pressures falling upon the volume-pressure line a—o will be delivered.

In a similar manner a second point f may be located corresponding to a pressure, volume and efficiency, all determined by testing the fan again with a different ratio of discharge opening and with either the same or a different tip speed. A second volume-pressure line f—o may then be drawn to the point of origin. Projecting the point g of intersection of this line and the fan line c—c, in a direction parallel to the volume rulings, and measuring from the base line e—e a distance corresponding to the determined efficiency, a second point h on the efficiency curve will be located.

Other points on the efficiency curve may be located from other tests until a sufficient number have been plotted to permit the curve to be drawn in. The chart will then appear as shown in Fig. 1. The several oblique and projection lines, together with the volume and pressure points determined by test, may now be erased, leaving a chart or diagram such as is shown in Fig. 2 having uniformly spaced volume rulings as abscissæ, rulings spaced according to square roots as ordinates to indicate pressures, a fan line, and an efficiency curve.

With this chart it is an exceedingly simple matter to determine data as to corresponding pressure, volume or efficiency. For example, if it is desired to ascertain the efficiency of the particular fan in delivering a volume of 90,000 cubic feet per minute at a pressure of three inches of water, the point corresponding to this volume and pressure will first be located upon the chart and a line drawn therefrom to the point of origin of the ruling. The point of intersection with the fan line when projected to the efficiency curve indicates the efficiency at which the fan will deliver the predetermined volume at the predetermined pressure, namely 56% efficiency.

By working backward from the efficiency curve, the volume can be easily ascertained which the fan in question will deliver at a predetermined efficiency and pressure, or the pressure which the fan will develop in delivering a certain volume at a certain efficiency.

Similar fans, that is, fans of different sizes but having the same proportions, all develop the same efficiency when operating at the same pressure and delivering volumes directly proportional to the areas of the fan outlets or the squares of the fan diameters. For example, given three fans all having the same proportions, but the linear dimensions of the second being twice those of the first, and of the third three times those of the first, then at the same pressure the second fan will deliver four times the volume of the first, and the third nine times such volume, but all at exactly the same efficiency.

If, therefore, other fan lines be placed upon the chart at distances from the line of pressure origin proportional to the reciprocals of the area of each fan or, what is the same thing proportional to the reciprocals of the square of the diameter of each fan, then the single efficiency curve of the chart will also indicate the efficiencies of the other fans at the different volumes and pressures.

Thus, the fan lines for the second and third fans above referred to would be placed at distances from the line of pressure origin one-fourth and one-ninth respectively the distance of the fan line of the first fan from such line of pressure origin.

In Fig. 3 is shown the chart of Fig. 2 with the additional fan lines j—j, k—k, l—l, and m—m, corresponding to different sizes of similar fans, these fan lines also being marked fan No. 5, fan No. 3, fan No. 2, fan No. 1, respectively, fan line c—c being marked fan No. 4. Assuming fan No. 1 is 24″ in diameter, the position of the fan line for fan No. 2 will correspond to a fan of 25½″ in diameter; that of fan No. 3 to a fan of 29″; that of fan No. 4 to a fan of 33″; and that of fan No. 5 to a fan of 42″ in diameter. This chart will be used exactly like the chart of Fig. 2 except that a number of fan lines will be intersected by the oblique line from the point of predetermined pressure and volume to the point of origin, thus indicating the several fans which are capable of delivering the required volume and pressure within the range of efficiency covered by the curve, and also showing at a glance the efficiency corresponding to each fan. An engineer or contractor is thus enabled in a quick and simple manner to select the fan best suited for any particular requirements as to volume, pressure and efficiency.

The pressure developed by a fan at a given ratio of opening is proportional to the square of the tip speed. Doubling the tip speed quadruples the pressure. Conversely the tip speed is proportional to the square root of the pressure. Given the pressures developed by a particular fan at certain measured tip speeds, and at certain ratios of opening, it is possible to calculate the various tip speeds corresponding to a certain pressure at the various ratios of opening. Such a curve for, say, three inches pressure, is shown in Fig. 3 at p—p, tip speeds being plotted as ordinates and ratios of opening as abscissæ, these being the same as the abscissæ of the efficiency curve. Other curves for other pressures may be calculated and plotted in to give a set of sufficient range.

Inasmuch as the pressures developed by similar fans are all the same at the same tip speed and ratio of opening, these curves of uniform pressure are applicable to all the fans of a series which are constructed in the same proportions.

If it be desired to determine the tip speed at which a fan must operate to deliver a predetermined volume of air at a specified pressure, the same method is followed as above described for determining the efficiency, the point of intersection with the fan line of the oblique line passing through that volume and pressure point being projected parallel to the line of volume origin until it intersects the curve corresponding to the predetermined pressure. The ordinate of this point indicates the tip speed desired.

If revolutions per minute are required it is only necessary to multiply the tip speed by the constant $\frac{1}{\pi d}$ in which $d$ is the fan diameter. Preferably a table of these constants for the fans covered by the chart will appear somewhere on the chart.

The work done by a fan is of two forms—kinetic energy and potential energy. The kinetic energy is a simple velocity of the air. The potential energy is a pressure usually called "static pressure." The pressure energy is by far the more important and it has become general trade practice to rate and compare fans on the basis of their pressure energy only. The general trade term for this pressure is "static pressure" to distinguish from "velocity pressure," and from "total pressure" which is the sum of the two. If a fan is credited only with its pressure energy, its efficiency, which is the ratio of the work done by the fan to the work absorbed by the fan, is called the "static efficiency."

The pressures heretofore referred to have been the static pressures, that is, the pressure in all directions due to the compression of the air, and inasmuch as sometimes the total pressure is desired, that is, the sum of the static pressure and velocity pressure a curve of the ratio of total pressure to static pressure may conveniently be plotted near the efficiency curve, with the same abscissæ and with the ratios as ordinates. By multiplying the static pressure assumed or indicated on the pressure ruling, by the corresponding ratio indicated on the ratio curve by projecting on to the curve the intersection of the volume-pressure line with the fan line, the total pressure for that particular fan at that particular volume and static pressure will be obtained. By subtracting the static pressure from the total pressure the velocity pressure may be obtained, and by a simple calculation the velocity of the air determined. All of these pressures are the pressures at the mouth or discharge opening of the fan casing.

While in the accompanying drawings the preferred form of chart is shown in which curves are employed for indicating the different values or amounts of the different data and for a number of similar fans of a line or series, the present invention is not to be limited, except when so specified in the claims, either to curves for indicating values or amounts or to the adaptability of the chart for use with more than a single fan, as the present invention contemplates broadly a chart or diagram for determining data as to the performance of a fan in which the volume rulings are uniformly spaced and the pressure rulings at right angles thereto are spaced according to square roots.

Having thus explained the nature and object of the present invention and described one form of embodiment thereof, what is claimed is:

1. A chart for determining the performance of fans, blowers, and the like, comprising cross lines, the lines in one direction being marked to designate volumes and being spaced uniformly, and the lines in the other direction being marked to designate pressures and being spaced from the line of zero pressure at distances proportional to the square roots of the pressures designated, whereby a straight line may be drawn from any point corresponding to the volume delivered and pressure developed by a particular fan to the point of zero volume and pressure to indicate the different volumes delivered and corresponding pressures developed by the fan running at different speeds but with a constant efficiency.

2. A chart for determining the performance of fans, blowers, and the like, comprising cross lines, the lines in one direction being marked to designate volumes and being spaced uniformly, and the lines in the other direction being marked to designate pressures and being spaced from the line of zero pressure at distances proportional to the square roots of the pressures designated, whereby a volume-pressure line drawn through the point of zero volume and pressure will indicate the different volumes delivered and corresponding pressures developed by a particular fan discharging through the same size orifice, and means for indicating another factor of the operation of the fan, so arranged that each value of such factor is associated with a particular volume-pressure line.

3. A chart for determining the performance of fans, blowers, and the like, comprising cross lines, the lines in one direction being marked to designate volumes and being spaced uniformly, and the lines in the other direction being marked to designate pressures and being spaced from the line of zero pressure at distances proportional to the square roots of the pressures designated, whereby a volume-pressure line drawn through the point of zero volume and pressure will indicate the different volumes delivered and corresponding pressures developed by a particular fan running at different speeds but with a constant efficiency, a fan line parallel with one set of lines, and means for indicating another factor of the operation of the fan, so arranged with respect to the section lines and to the fan line that each value of such factor corresponds to the point of intersection of the fan line and a particular volume-pressure line.

4. A chart for determining the performance of fans, blowers, and the like, comprising cross lines, the lines in one direction being marked to designate volumes and being spaced uniformly, and the lines in the other direction being marked to designate pressures and being spaced from the line of zero pressure at distances proportional to the square roots of the pressures designated, whereby a volume-pressure line drawn through the point of zero volume and pressure will indicate the different volumes delivered and corresponding pressures developed by a particular fan at the same efficiency of operation, and a curve indicating another factor of the operation of the fan so positioned with relation to the volume-indicating and the pressure-indicating lines that each point on the curve corresponds to a particular volume-pressure line.

5. A chart for determining the performance of fans, blowers, and the like, comprising cross lines, those in one direction marked to designate volumes, and spaced uniformly, and those in the other direction marked to indicate pressures, and spaced at distances proportional to square roots of the pressures designated, and said chart provided with supplemental rulings parallel to the pressure rulings to indicate the different sizes of fans of the same proportions, the supplemental rulings being spaced from the line of zero pressure at distances proportional to the reciprocals of the squares of the diameter of the fans, respectively.

6. A chart for determining the performance of fans, blowers, and the like, comprising cross lines, those in one direction marked to designate volumes, and spaced uniformly, and those in the other direction marked to indicate pressures, and spaced at distances proportional to square roots of the pressures designated, and said chart provided with supplemental rulings parallel to the pressure rulings to indicate the different sizes of fans of the same proportions, the supplemental rulings being spaced from the line of zero pressure at distances proportional to the reciprocals of the squares of the diameters of the fans, respectively, and a single efficiency curve so positioned with relation to the volume-indicating and pressure-indicating lines and to the supplemental rulings that it will indicate the efficiencies of operation of the different fans at the different volumes and pressures.

7. A chart for determining the performance of fans, blowers, and the like, comprising cross lines, those in one direction marked to designate volumes, and spaced uniformly, and those in the other direction marked to indicate pressures, and spaced at distances proportional to square roots of the pressures designated, and said chart provided with supplemental rulings parallel to the pressure rulings and marked to designate different sizes of fans of the same proportions, the supplemental rulings being spaced from the line of zero pressure at distances proportional to the reciprocals of the squares of the diameters of the fans, respectively, and a single set of curves each corresponding to a different pressure so arranged with respect to the cross lines and the supplemental rulings that the curves will indicate the tip speeds corresponding to the different volumes delivered by the different fans at the different pressures.

8. A chart for determining the performance of fans, blowers, and the like, comprising a plurality of parallel lines intersecting other parallel lines, the lines in one direction marked to indicate volumes and being spaced from the line of zero volume at distances proportional to the volumes designated, certain of the lines in the other direction marked to indicate pressures and being spaced from the line of zero pressure at distances proportional to the square roots of the pressures designated, others of the lines in said other direction marked to indicate efficiencies, a fan line parallel with the pressure-indicating lines and crossing the volume-indicating lines, and an efficiency curve crossing the efficiency-indicating lines, the fan line being spaced at such a distance from the line of zero pressure and the efficiency curve being so located upon the efficiency lines and with such relation to the volume-indicating lines that each point on the efficiency curve indicates the efficiency of the fan when delivering at the pressure corresponding to the fan line the volume corresponding to the particular point of the curve.

9. A chart for determining the performance of fans, blowers, and the like, comprising a plurality of parallel lines intersecting other parallel lines, the lines in one direction marked to indicate volumes and being spaced from the line of zero volume at distances proportional to the volumes designated, certain of the lines in the other direction marked to indicate pressures and being spaced from the line of zero pressure at distances proportional to the square roots of the pressures designated, others of the lines in said other direction marked to indicate efficiencies and being spaced from the line of zero efficiency at distances proportional to the efficiencies designated, a plurality of fan lines parallel with the pressure lines and crossing the volume-indicating lines, the fan lines corresponding to different sizes of similar fans being spaced from the line of zero pressure at distances proportional to the reciprocals of the squares of corresponding linear dimensions of the several fans, an efficiency curve crossing the efficiency-indicating lines, the efficiency curve being so located with relation to the volume indicating lines that each point on the curve indicates the efficiency of each fan when delivering at the pressure corresponding to the position of its fan line the volume corresponding to the particular point on the curve.

10. A chart for determining the performance of fans, blowers, and the like, comprising a plurality of parallel lines intersecting other parallel lines, the lines in one direction marked to indicate volumes and being spaced from the line of zero volume at distances proportional to the volumes designated, certain of the lines in the other direction marked to indicate pressures and being spaced from the line of zero pressure at distances proportional to the square roots of the pressures designated, others of the lines in said other direction marked to indicate tip speeds and being spaced from the line of zero tip speed at distances proportional to the tip speed designated, a fan line parallel with the pressure-indicating lines and crossing the volume-indicating lines, and a plurality of curves corresponding to and marked to indicate different pressures crossing the tip-speed-indicating lines, and so located with respect to the fan line and with relation to the volume-indicating lines that the different points on the particular curve which has the same pressure designation that the fan line has indicate the different tip speeds at which the fan will deliver at said pressure the different volumes corresponding to the different points on the curve, the other tip speed curves being so located with relation to the particular tip speed curve and to the line of zero tip speed that the points on the several curves corresponding to the same volume-indicating line are spaced from the line of zero tip speed at distances corresponding to the square roots of the pressures designating each of the tip speed curves, respectively.

11. A chart for determining the performance of fans, blowers, and the like, comprising a plurality of straight parallel lines spaced apart a uniform distance and a plurality of straight parallel lines crossing the first mentioned lines at right angles, some of the last mentioned lines being spaced apart a uniform distance and others being spaced non-uniformly at distances from one of said lines as a base line proportional to square roots of an arithmetical series.

12. A chart for determining the performance of fans, blowers, and the like, comprising a plurality of straight parallel lines spaced apart a uniform distance and a plurality of straight parallel lines spaced apart at non-uniform distances from one another and crossing the first mentioned lines at right angles, some of said last mentioned lines being spaced from one of said lines as a base line at distances proportional to square roots of an arithmetical series, and others of said last mentioned lines being spaced from said base line at distances proportional to the reciprocals of squares.

HAROLD F. HAGEN.